United States Patent
Beaudin (12)

(10) Patent No.: US 6,661,858 B1
(45) Date of Patent: Dec. 9, 2003

(54) DC RESTORATION CIRCUIT FOR A RADIO RECEIVER

(76) Inventor: André Beaudin, 841 Radisson, Boucherville, Quebec (CA), J4B 5R8

( * ) Notice: Subject to any disclaimer, the term of this patent is extended or adjusted under 35 U.S.C. 154(b) by 561 days.

(21) Appl. No.: 09/659,916

(22) Filed: Sep. 12, 2000

(51) Int. Cl.⁷ .................................................. H04B 1/10
(52) U.S. Cl. ........................ 375/350; 375/232; 327/307
(58) Field of Search ................................ 375/229, 232, 375/316, 319, 346, 350, 285, 317, 233; 327/307, 311

(56) References Cited

U.S. PATENT DOCUMENTS

| | | | |
|---|---|---|---|
| 3,715,670 A | * 2/1973 | Hirsch et al. ................ | 375/232 |
| 4,691,235 A | 9/1987 | Okui et al. | |
| 5,329,587 A | 7/1994 | Morgan et al. | |
| 5,629,960 A | 5/1997 | Dutkiewicz et al. | |
| 5,684,827 A | * 11/1997 | Nielsen ........................ | 375/232 |
| 5,778,028 A | * 7/1998 | Turner ......................... | 375/229 |
| 5,844,439 A | 12/1998 | Zortea | |
| 5,887,059 A | 3/1999 | Xie et al. | |
| 6,504,884 B1 | * 1/2003 | Zvonar ........................ | 375/346 |
| 6,553,081 B1 | * 4/2003 | Goodson ...................... | 375/296 |
| 2002/0172276 A1 | * 11/2002 | Tan et al. .................... | 375/233 |
| 2003/0099310 A1 | * 5/2003 | Zvonar ........................ | 375/340 |

FOREIGN PATENT DOCUMENTS

WO    WO98/52330    * 11/1998

* cited by examiner

*Primary Examiner*—Jean B. Corrielus
(74) *Attorney, Agent, or Firm*—Workman Nydegger

(57) ABSTRACT

This invention relates to communications (radio) receiver circuitry and, in particular, to circuitry for eliminating a varying DC distortion component of a demodulated received information signal such as comprising data packets. This invention uses an adaptive filter, and a corresponding adaptive (equalization) feedback signal, to remove a slow varying (exponential) DC component of the signal. In the decoding circuitry of a receiver the adaptive filter (e.g. an LMS filter) compares the outputs of an integrate and dump component to adapted outputs of a decision component in order to produce an error signal which inherently corresponds to the varying DC component of the symbol stream. This equalizing adaptive error signal is fed back and subtracted from the symbol integral stream to remove the varying DC component therefrom and thereby restore the information packet to a level DC bias condition.

7 Claims, 2 Drawing Sheets

US 6,661,858 B1

DC RESTORATION CIRCUIT FOR A RADIO RECEIVER

FIELD OF THE INVENTION

This invention relates to radio receiver circuitry and, in particular, to circuitry for removing a varying DC distortion component of a received information packet signal.

BACKGROUND OF THE INVENTION

Wireless (radio) information signals are transmitted in packets with each packet typically containing several portions such as an initial preamble portion, a synchronizing portion and a data portion, the packets having been appropriately modulated for radio transmission. Due to a number of interference sources to which the radio signal becomes subject prior to decoding in the receiver and other factors such as TX frequency drift during transmission, each received packet is prone to have a high amplitude perturbation at the beginning and then a slow drift thereafter until the end of the packet. This varying amplitude constitutes a varying DC distortion component of the received signal and, disadvantageously, causes errors in the conversion and decoding of the demodulated data signal to an output data signal.

To deal with this DC distortion component of the demodulated data signal it is known to use an AC coupling RC network or some other linear filtering circuitry, to remove the initial high amplitude (i.e. baseline) component and thereby fix the DC level of the preamble portion of the packet. However, these known solutions do not address the problem of the slow varying DC distortion which occurs throughout the packet. U.S. Pat. No. 5,629,960 to Dutkiewicz et al provides a method for reducing a DC distortion component (interference) produced during the transmit mode of a duplex packet switched data communications system. This interference in the receiver occurs during the period of the transmit ON/OFF keying on the transmitter and this is a known event. Dutkiewicz et al provide a DC off-set tracking filter, operative on the demodulated received signal after it has been converted to a digital signal and immediately prior to the symbol timing recovery stage, having a bandwidth which is fixed on a timed basis such that the timing of the operation of the fixed bandwidth filter matches the timing of the ON/OFF keying. Disadvantageously, however, this solution is directed only to a fixed (known) source of DC interference.

Accordingly, there is a need for a means of removing multiple contributory sources of varying DC off-set in a received signal in order to restore the signal to a level DC set-off.

SUMMARY OF THE INVENTION

In accordance with the invention there is provided DC restoration circuitry for a communications receiver for removing a varying DC component of an information signal comprising a stream of symbols (e.g. radio packets), the receiver comprising symbol recovery circuitry including a decision component is for evaluating symbol acquisition values (e.g. symbol integrals or symbol samples) and producing a decision for each evaluated symbol acquisition value. An adaptive filter produces estimates of input symbol acquisition values which are correlated to the decisions made by the decision component for previously input symbol acquisition values (but which are not correlated to the DC component) and subtracts these estimates from the input symbol acquisition values to produce a feedback error signal which is used to restore the DC level of the stream of symbols. The error signal represents the varying DC component. Further, an amplitude estimator component is preferably provided for estimating the amplitude of the received symbols and producing an amplitude estimate signal which is used by the adaptive filter for scaling the decisions produced therein.

The symbol recovery circuitry may include an integrate and dump component configured for producing the symbol acquisition values for evaluation by the decision component and a symbol timing recovery component, the symbol acquisition values being symbol integrals and the error signal being subtracted from the symbol integrals output from the integrate and dump component.

The adaptive filter may comprise an LMS controller configured for controlling the correlation of the decisions for producing the estimates. Preferably, a correlator module is provided for detecting the presence and ending of a preamble portion of the received information packet and a preamble filter component provides a preamble DC component of the received stream of symbols whereby a preamble ending DC component is provided on detection of the ending of the preamble portion, together with switching means for causing subtraction of the preamble DC component from the received stream of symbols when the presence but not the ending of the preamble is detected and for instead causing subtraction of the preamble ending DC component from the received stream once the ending of the preamble has been detected.

This invention uses an adaptive filter, and a corresponding adaptive (equalization) feedback signal, in an unusual and surprising manner to remove a slow varying (exponential) DC component in a data signal. In a receiver decoder the adaptive filter (e.g. an LMS filter) compares the outputs of an "integrate and dump" or "sample and hold" component, for example, to adapted outputs of a decision component in order to produce an error signal which inherently corresponds to the varying DC component of the received symbol stream. This equalizing adaptive error signal is fed back and subtracted from the symbol integral stream to remove the varying DC component therefrom and the DC restored integral stream is fed to the decision component. Although this DC restoration circuitry is advantageously suited for use in receivers for packet data communications systems it could also be used in receivers for synchronous data systems.

BRIEF DESCRIPTION OF THE DRAWINGS

Reference will now be made to the accompanying drawings which show, by way of example, a preferred embodiment of the present invention, and in which like reference numerals refer to like elements throughout.

DETAILED DESCRIPTION OF THE ILLUSTRATED PREFERRED EMBODIMENT

Figure 1:
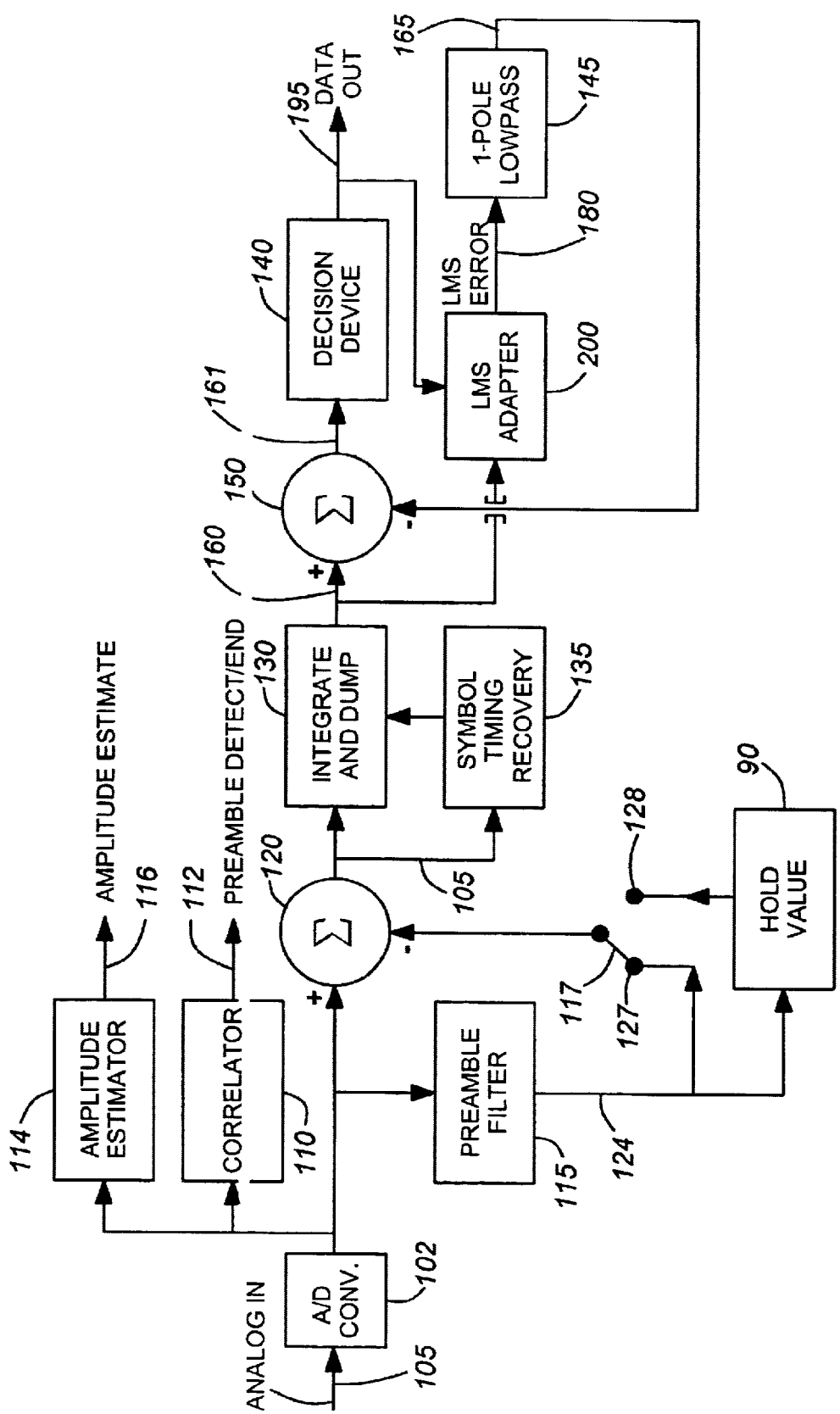
FIG. 1 is an overall schematic diagram of a DC restoration circuit in accordance with the invention; and, FIG. 2 is a detailed schematic diagram of the LMS adapter component 200 shown in FIG. 1.

FIG. 1 of the drawings is a block diagram of the components of a preferred embodiment of the DC restoration circuit of the present invention, this embodiment being operative after an FM discriminator circuit (demodulator) of a radio receiver. In this embodiment the received information signal is a packet and the format of the packet comprises three portions, namely, an initial preamble having a length of about 5 to 10 milliseconds and being a tone, a synchronizing pattern following the tone and a data portion comprised of a stream of symbols following thereafter.

As shown in FIG. 1, an analog input signal 105, having been output from an FM discriminator, is fed into an analog-to-digital (A/D) converter 102 and the digital signal output from the A/D converter (referred to herein as the "digitized input signal") is input to each of a correlator circuit 110, which detects the presence and ending of the preamble tone and produces a preamble detect/end signal 112, and a signal amplitude estimator 114 which produces a signal 116 corresponding to an estimate of the signal amplitude. The digitized input signal is also passed through a preamble filter 115 which removes the tone to recover the DC component of the preamble and this DC component 124 is output from filter 115. The DC component 124 is fed to a "hold value" component 90 which stores the value of the DC component 124. When the preamble is detected but the end of the preamble has not yet been detected a switch 117 is caused to be in a preamble detect position 127 whereby the DC component 124 currently being detected (i.e. prior to the end of the preamble) is subtracted from the input signal via adder 120. However, when the end of the preamble is detected the output of the "hold value" component 90 is the DC component value occurring at the time the end of the preamble is detected and the switch 117 is caused to be in a preamble ending position 128 whereby that ending DC component 124 is thenceforth, for that packet, subtracted from the input signal via adder 120.

Decoding (i.e. recovery) of the data portion of the digitized input signal begins by the end of the preamble. This is done in a conventional manner by an integrate and dump component 130, and a symbol timing recovery component 135 which is a phase-locked loop (PLL), into each of which a symbol stream 108 (with the DC bias present at the preamble stage having been removed) has been input, and a decision component 140 for evaluating a symbol acquisition value for each of the symbols of the symbol stream. The varying DC component of the received symbol stream is determined, and subtracted from the output 160 of the integrate and dump component 130 (this output being the symbol acquisition values), by a feedback LMS adaptive circuit 200 using the outputs 160, 195 of the integrate and dump and decision components 130, 140, resp., as shown in FIG. 1. The output of the LMS adaptive circuit 200 is an LMS error signal 180 and this error signal 180 is input to a single pole lowpass filter 145 and the resulting filtered error signal 165, which corresponds to the varying DC component, is fed back and subtracted from the integral output stream 160 by an adder 150. The error signal 165 is inherently adaptive and is used as a feedback signal to adjust the integral output stream 160 by removing therefrom the varying DC component. The varying DC component is, therefore, not present in the output integral stream 161 which is fed into the decision component 140. Advantageously, the resultant output data signal 195 does not include either the high DC bias associated with the preamble or the slow varying (exponential) DC component associated with the remaining portions of the input information packet.

Figure 2:
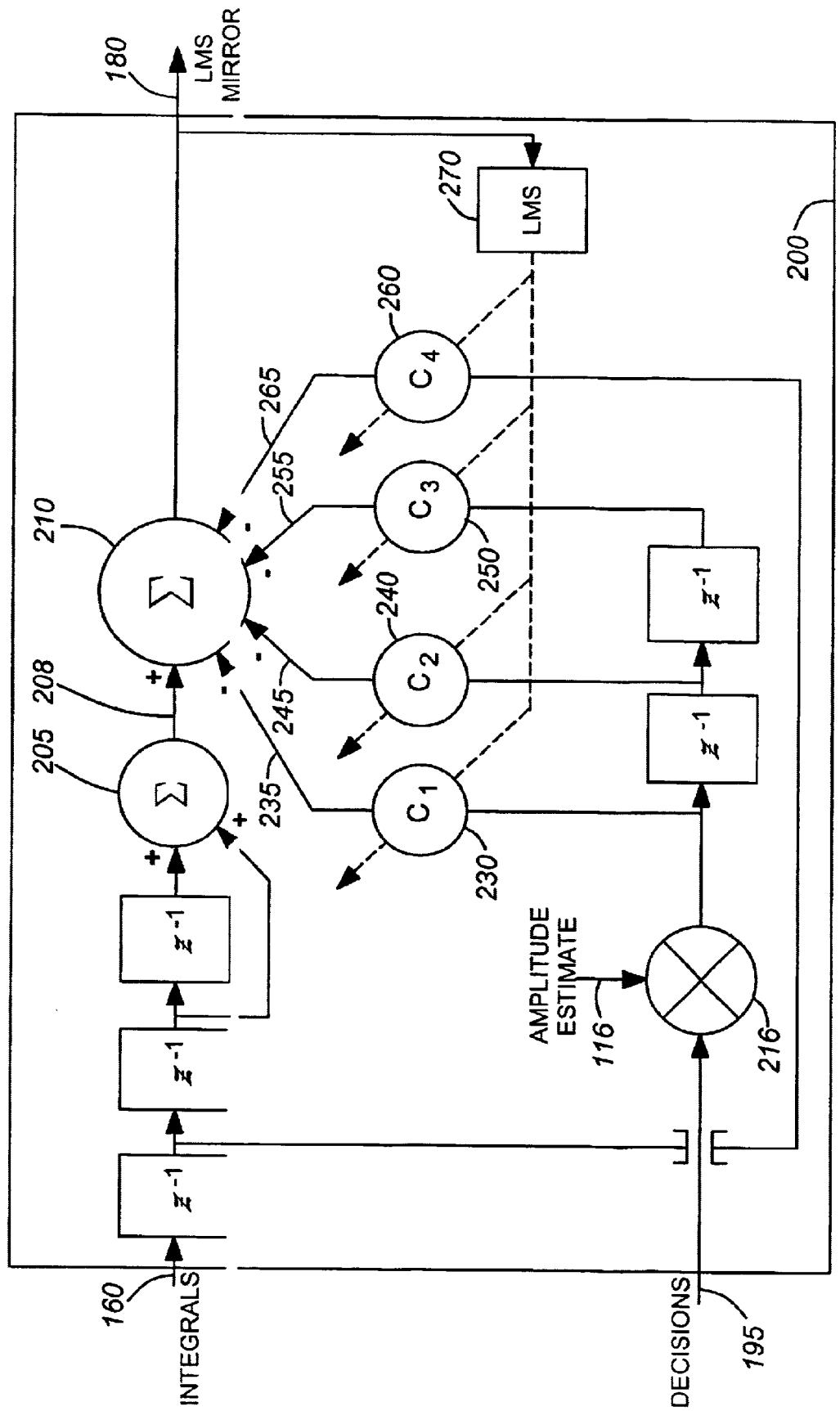

FIG. 2 of the drawings shows the components of the LMS adaptor 200 of the DC restoration circuit of this preferred embodiment. These components, as well as those of the symbol recovery circuitry shown in FIG. 1 (other than the A/D converter 102), are implemented in a digital signal processor (DSP) in this embodiment. The decisions 195 output from the decision component 140 are input to the LMS adaptor component 200 and scaled by the amplitude estimate signal 116 via a multiplier 216. In addition, as shown by FIG. 2, the symbol integrals 160, referred to herein as symbol acquisition values, are input to the LMS adaptor 200. In the LMS adaptor the current and past two decisions ($Z^{-1}$ in FIG. 2 represents a one symbol delay) and the symbol acquisition value (integral) of the next decision are scaled by gain controllers 230, 240, 250 and 260, respectively, having gain coefficients $C_1$, $C_2$, $C_3$ and $C_4$, resp. This configuration constitutes a transversal filter that estimates the two-symbol integral output 208 of the adder 205. A second adder 210 compares the integral output 208 with the estimate formed by the sum of the outputs 235, 245, 255 and 265 of the gain controllers. The difference signal output by adder 210 is the LMS error signal 180. The LMS error signal 180 is also used by an LMS controller (algorithm) 270 to adjust the coefficients $C_1$, $C_2$, $C_3$ and $C_4$. Due to the inherent high pass nature of the LMS adaptor component 200 the error signal 180 tracks the DC component of the integral stream. That is, since the four taps (230–260) of the LMS adaptive filter 200 are related to the actual digital signal and since there is no DC tap, the estimate signal (i.e. the sum of tapped signals 235, 245, 255 and 265) cannot track the DC content of the input integrals (and this makes the adaptive filter 200 an inherently high pass filter).

Although an "integrate and dump"—type decoder is used for the preferred embodiment other types of decoders, such as the "sample and hold"—type could instead be used. In the case of the former, per the foregoing, the symbol acquisition value is an integral of the symbol and in the case of the latter the symbol acquisition value would be a symbol sample. In each case the value needed is a metric proportional to the symbol amplitude (i.e. whether as integral or sample).

The individual circuit and processing functions utilised in the foregoing described preferred embodiment are, individually, well understood by those skilled in the art, and it is to be understood by the reader that a variety of other implementations may be devised by skilled persons for substitution. Further, it should be noted that although the circuit components described herein are preferably implemented in software by performing digital signal processing (DSP) operations on the data it is possible to implement one or more of these components in hardware. Persons skilled in the field of communication design will be readily able to apply the present invention to an appropriate implementation method for a given application.

Consequently, it is to be understood that the particular embodiment shown and described herein by way of illustration is not intended to limit the scope of the invention claimed by the inventor which is defined by the appended claims.

What is claimed is:

1. DC restoration circuitry for a communications receiver for removing a varying DC component of an information signal comprising a stream of symbols, said receiver comprising symbol recovery circuitry including a decision component for evaluating symbol acquisition values and producing a decision for each evaluated symbol acquisition value, said DC restoration circuitry comprising an adaptive filter configured for producing estimates of input symbol acquisition values which are correlated to the decisions made by said decision component for previously input symbol acquisition values and for subtracting said estimates from said input symbol acquisition values to produce a feedback error signal used to restore the DC level of said stream of symbols, wherein said estimates are not correlated to said DC component and said error signal represents said varying DC component.

2. DC restoration circuitry according to claim 1 wherein said information signal is a packet.

3. DC restoration circuitry according to claim 2 wherein said symbol recovery circuitry includes an integrate and dump component configured for producing said symbol acquisition values for evaluation by said decision component and a symbol timing recovery component, said symbol acquisition values being symbol integrals.

4. DC restoration circuitry according to claim 3 wherein said error signal is subtracted from said symbol integrals output from said integrate and dump component.

5. DC restoration circuitry according to claim 4 wherein said adaptive filter comprises an LMS controller configured for controlling the correlation of said decisions for producing said estimates.

6. DC restoration circuitry according to claim 5 and further comprising a correlator module configured for detecting the presence and ending of a preamble portion of said received information packet, a preamble filter component configured for providing a preamble DC component of said received stream of symbols whereby a preamble ending DC component is provided on detection of the ending of said preamble portion and switching means for causing subtraction of said preamble DC component from said received stream of symbols when the presence but not the ending of said preamble is detected and for causing subtraction of said preamble ending DC component from said received stream once the ending of said preamble has been detected.

7. DC restoration circuitry according to claim 1 and further comprising an amplitude estimator component configured for estimating the amplitude of said received symbols and producing an amplitude estimate signal, wherein said adaptive filter scales said decisions by said amplitude estimate signal.

* * * * *

UNITED STATES PATENT AND TRADEMARK OFFICE
CERTIFICATE OF CORRECTION

PATENT NO.    : 6,661,858 B1
DATED         : December 9, 2003
INVENTOR(S)   : Andre Beaudin Page 1 of 1

It is certified that error appears in the above-identified patent and that said Letters Patent is hereby corrected as shown below:

<u>Drawings</u>,
Sheet 1, Figure 1, the reference numeral -- 108 -- should be applied to the output of adder 120 instead of label "105"
Sheet 2, Figure 2, at reference numeral 180, "LMS MIRROR" should read -- LMS ERROR --

Signed and Sealed this

Eighth Day of June, 2004

JON W. DUDAS
*Acting Director of the United States Patent and Trademark Office*